July 3, 1928.

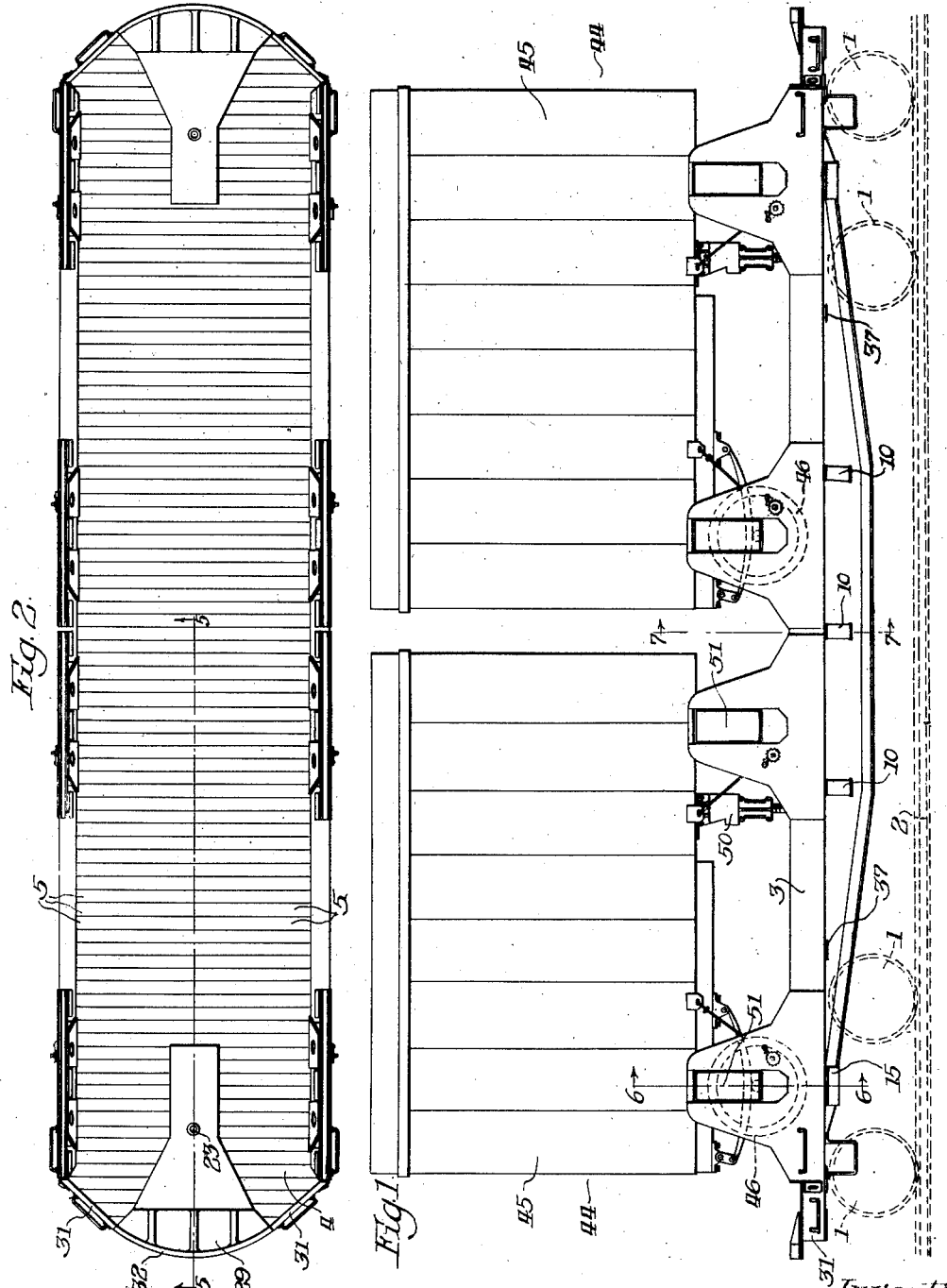

H. A. OTIS 1,675,512

MEANS FOR TRANSPORTING GOODS

Filed March 31, 1926     6 Sheets-Sheet 2

Witness:
Geo. C. Davison

Inventor:
Harold A. Otis.
By Brown, Boettcher & Dieman
Attys

July 3, 1928.

H. A. OTIS 1,675,512

MEANS FOR TRANSPORTING GOODS

Filed March 31, 1926

H. A. OTIS 1,675,512

MEANS FOR TRANSPORTING GOODS

Filed March 31, 1926        6 Sheets-Sheet 4

Witness:
Geo. C. Dawson

Inventor:
Harold A. Otis
By Brown, Critchlow & Sirman
Attys

July 3, 1928.　　　　　　　　　　　　　　　　1,675,512
H. A. OTIS
MEANS FOR TRANSPORTING GOODS
Filed March 31, 1926　　　6 Sheets-Sheet 5

Inventor:
Harold A. Otis

July 3, 1928.

H. A. OTIS

MEANS FOR TRANSPORTING GOODS

Filed March 31, 1926

Witness:
Geo. E. Davison

Inventor:
Harold A. Otis.
By Brown, Boettcher & Dienner
Attys

Patented July 3, 1928.

1,675,512

UNITED STATES PATENT OFFICE.

HAROLD A. OTIS, OF CHICAGO, ILLINOIS, ASSIGNOR TO CHICAGO NORTH SHORE & MILWAUKEE RAILROAD COMPANY, OF CHICAGO, ILLINOIS, A CORPORATION OF ILLINOIS.

MEANS FOR TRANSPORTING GOODS.

Application filed March 31, 1926. Serial No. 98,746.

My invention relates to transportation of goods in less than carload lots and is more particularly concerned with the provision of a track vehicle upon which may be transported one or more compartments or containers holding goods in less than carload lots, and which removable compartments or containers are each provided with road wheels for transport over a road or street through connection with a tractor or other dirigible road motor vehicle.

The present application discloses the preferred form of railway car and trailer employed in the system of transporting goods disclosed and claimed in the co-pending application of Britton I. Budd, Serial No. 98,818, filed March 31, 1926.

The car of my invention is adapted to receive commercial trailers or semi-trailers and to hold them rigidly in place to be transported by rail from a collecting and loading point to an unloading and distributing point.

I am aware that it is old to load a plurality of boxes or compartments for less than carload lot shipments upon a railroad track car, and to collect and distribute such boxes or compartments as, for example, by a derrick at the station, but in the system in connection with which my invention is used the boxes or compartments are preferably road vehicles and they are loaded and unloaded by the power of the tractor which collects and distributes them.

The interposition of the road wheels and chassis between the box or compartment and the platform of the car tends to raise the center of gravity. Furthermore, the presence of the wheels and running gear renders the frictional holding power between the bottom of the box or compartment and the platform of the railway car unavailable to hold the box or compartment upon the car. This is apparent when it is considered that the wheels are employed for the purpose of raising the compartment above the road and for making the compartment mobile and keeping it so.

The car of my invention provides a low platform to keep down the center of gravity of the load with respect to the supporting rails. It provides, also, readily attachable and detachable means for anchoring and bracing the load independently of the road wheels or other supports provided on the road vehicle. It provides guiding flanges and stanchions for guiding the road vehicle properly onto and off of the platform and for supporting the compartment against side sway on the car.

The trailer or semi-trailer is in reality a compartment on road wheels, or adapted to be put upon road wheels in such a manner that the trailer or dirigible motor vehicle may, by its own power, take the compartment over the streets or roads intervening between the point of loading the compartment with goods and the point of placing the compartment upon the railroad car, and in addition actually place the compartment upon the railroad car or remove it therefrom by the power of such dirigible motor vehicle. The motor vehicle thereby serves in the dual capacity of a hauling tractor and of a loading device, all as is more fully described in the aforesaid co-pending application of Britton I. Budd.

Now, in order to acquaint those skilled in the art with the manner of constructing and operating a device of my invention, I shall disclose in connection with the accompanying drawings a specific embodiment of the invention.

In the drawings:—

Figure 1 is a side elevational view of a loaded car embodying my invention;

Fig. 2 is a plan view of the railroad car;

Fig. 8 is a fragmentary side view of the bail member; and

Figs. 9 and 10 are side and end views, respectively, of the wedge for backing up the strut.

Figure 6:
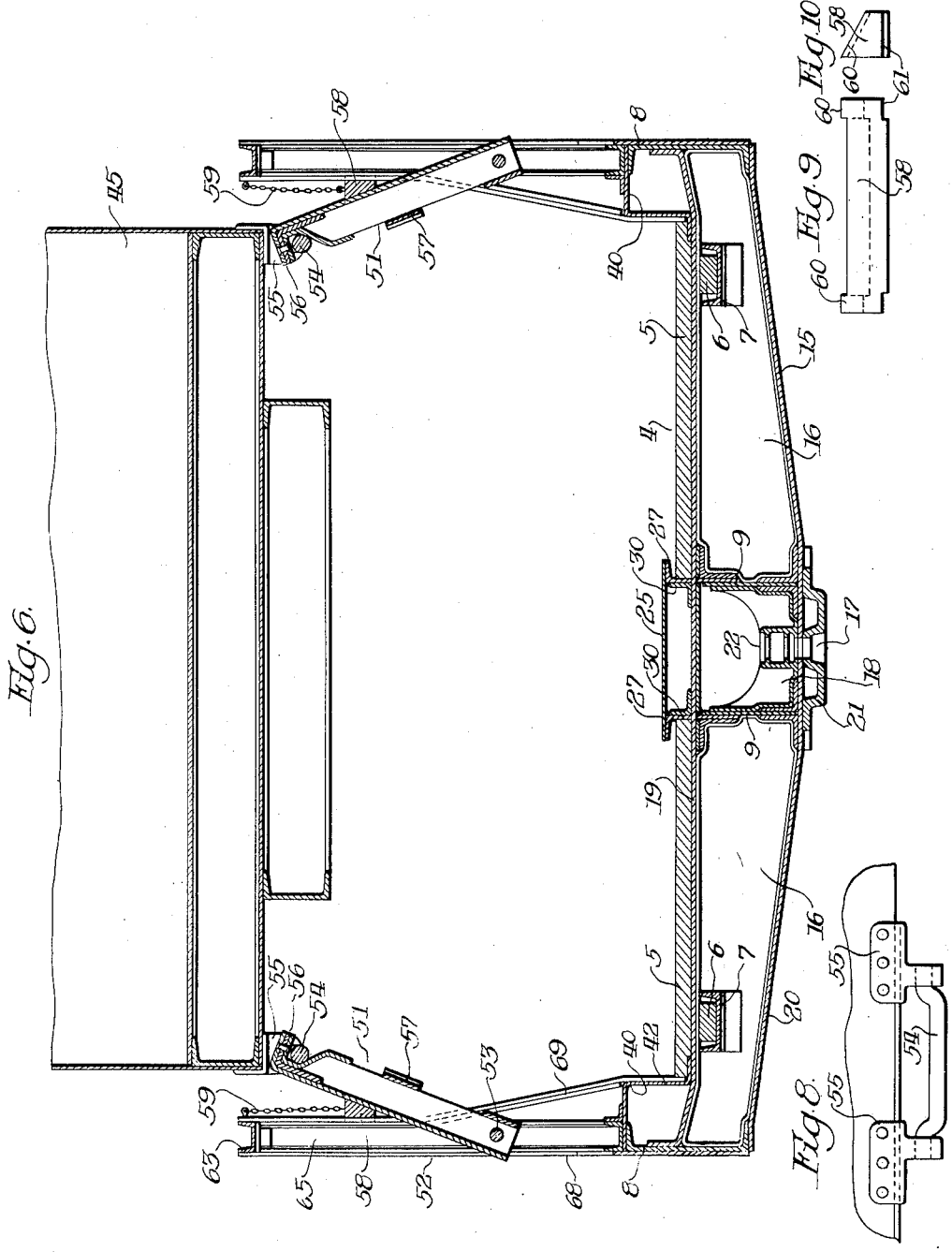
Fig. 6 is a transverse section taken on the line 6—6 of Fig. 1 showing the position of the supporting struts.
Figure 7:
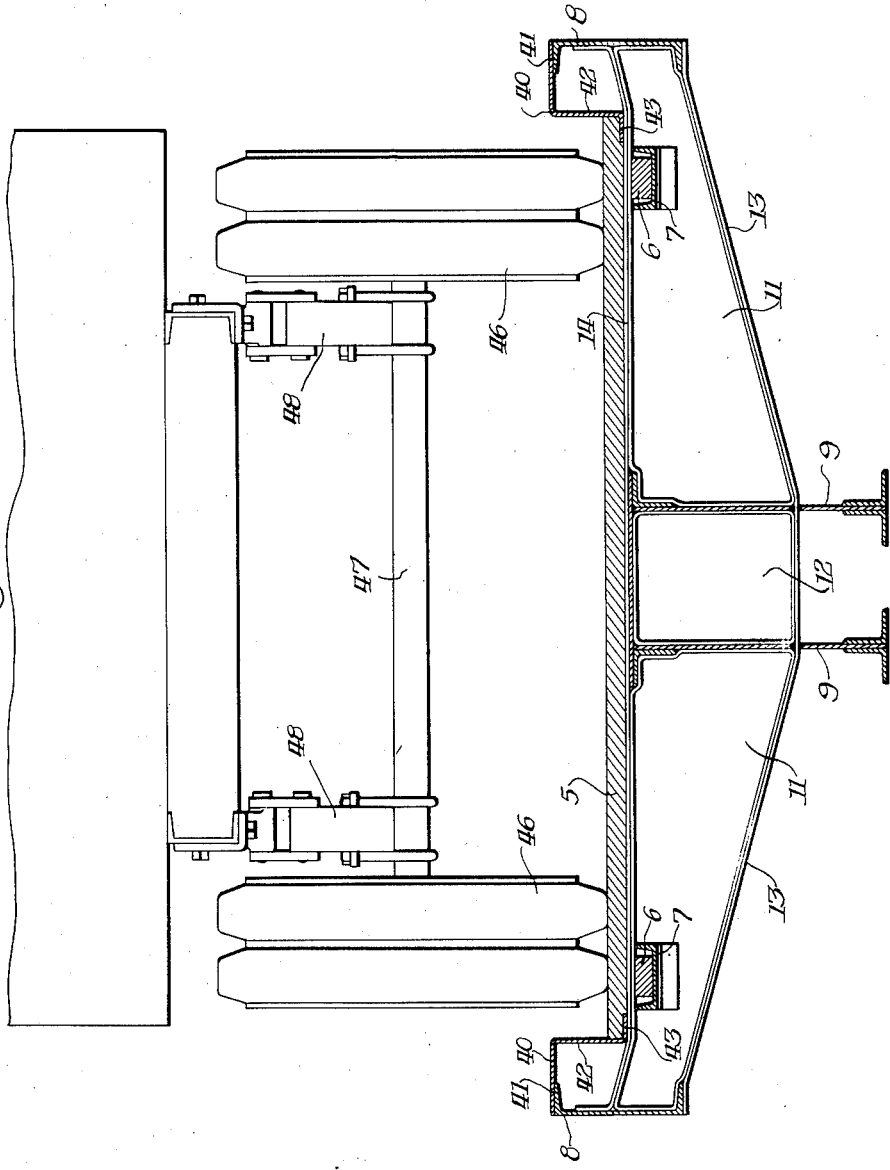
Fig. 7 is a section taken on the line 7—7 showing a cross section of a platform of the car.

Referring to Fig. 1, the car of my invention comprises track wheels 1 embodied in a suitable truck which may be of standard or any preferred design, these wheels being adapted to run upon the rails 2 of a railroad. The wheels, truck and rails may be of standard design of standard gauge, or of any preferred construction and gauge. The main body 3 of the car is suitably mounted upon the truck through pivotal connections, such as are well understood by those skilled in the art and which form in themselves no novel feature of the present invention. The body 3 provides a platform 4 having the floor boards 5, tongued and grooved together and nailed to longitudinal wooden sills or stringers 6 disposed in a recess provided by the longitudinal channel bars 7 to which said wooden sills 6 are preferably bolted. The frame of the car comprises the side sill members 8 which are relatively deep channels having their flanges turned inwardly towards the central part of the car. The back bone of the car is formed of two longitudinal sills 9, 9 of greater section at the central part than towards the ends, and these longitudinal sills are preferably built up of plates and angles, as will be apparent from Figs. 6 and 7. The side sills comprising the channels 8, 8 and the center sills 9, 9 are connected together at their centers by three cross frame members 10, 10, 10, formed as will be apparent from inspection of Fig. 7, of pressed steel plates shaped into two similar end members 11, 11 and a center plate 12. These end plates 11, 11 are flanged, and they extend between the web of the longitudinal center sills 9 and the web and lower angle of the longitudinal side sills 8. The center plate 12 is disposed between the webs and upper flanges of the central sills 9, 9 and these plates 11, 11 and 12, together with the side sills and the center sill, are tied together by a bottom chord plate 13 and a top chord plate 14. These chord plates are riveted to the flanges of the plates 11, 11 and 12 and to the lower web and flange, respectively, of the side sill members 8, and extending through and over, respectively, the central sill members 9, 9. The longitudinal channels 7, 7 on each side are secured between respective plates 11 on the same side of the car body. The ends of the center sill members 9, 9 are anchored in cross beams 15 shown in Fig. 6, each cross beam being built up of similar plates 16 which are flanged to bear at their outer ends against the web of the longitudinal side frames 8, and at their inner ends to fit against the web of the center sill members 9, 9. A center bearing or king pin connection 17 is disposed at this junction of the cross frame 15 with the longitudinal frames 8 and the center sills 9, and a connection for a draw bar is provided by means of the yoke casting 18, which is disposed between the ends of the center sills 9. The flange plates 16, which form the webs of the end cross members 15, are secured to the respective parts against which they abut by means of the chord plates 19 and 20 at the top and bottom of the same, respectively. These chord plates 19 and 20 are continuous from the side sill members 8 where they are riveted to the inner side of the web across the flanges of the plates 16, 16 and over the flanges of the center sills 9, 9. Likewise, the bottom cross plate 20 is fastened at one end to the lower flange of the longitudinal sill 8 and then extends along the flange of the plate 16, then across the bottom flanges of the longitudinal sill members 9, 9 at the center, then across the flange of the plate member 16 to the bottom flange of the opposite longitudinal sill 8. A center bearing plate, preferably in the form of a casting 21, is secured below the bottom chord plate 20 and it co-operates with the center bearing of the truck having the track wheels 1. A central opening 22 for receiving a king pin connection is provided in the castings 18 and 21 and extends through the bottom chord plate 20.

Since the platform 4 is made as low as possible, and since the height of the coupler or draft rigging must be maintained standard in order to co-operate with other standard railroad cars, the socket 22 which receives the end of the draw bar, comes up substantially to the level of the platform 4. The socket 22 has a vertical hole 23 for a pivot pin to mount the draw bar. The cross beam 15, which in fact comprises the body bolster, is formed as a box beam of two sets of plates 16, 16 with their flanges extending outwardly away from each other and joined by the cross plates 19 and 20, which are wide enough to connect the same.

In order to house the draw bar, which for the sake of clearness is not illustrated in the drawing, and the socket 22 which receives the inner end of the same, I provide the plate 25 which, at its inner end 26, is inclined downwardly back of the box beam or body bolster 15 and is secured through the top chord plate of the center sill 9, 9. The plate 25 is supported upon the channel bars 27, 27 which extend forwardly to a point about even with the socket 22 for the draw bar connection and then flare outwardly and have their outer ends joined to the bottom of the buffer casting 29 by riveting to the bottom of the same. The rear ends of the channel bars 27, 27 are mounted upon the body bolster through the short angles 30, as will be apparent from Figs. 5 and 6.

Figure 5:
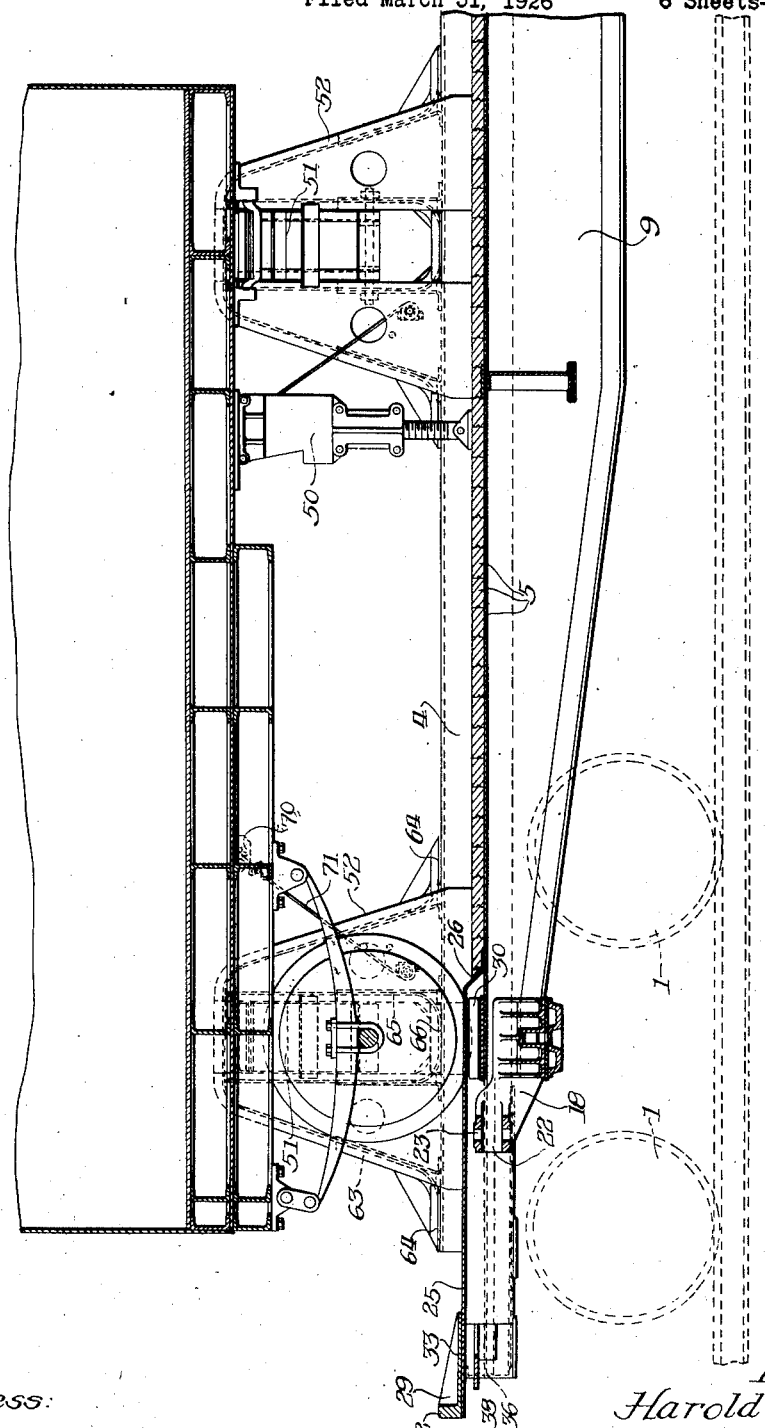
Fig. 5 is a longitudinal section taken on the line 5—5 of Fig. 2 and shown on an enlarged scale.

At the ends of the car body the channel bars 8, which form a part of the side frames or sills, are provided with channel extensions of less depth, as will be apparent from Figs. 1 and 5, these channel members 31 being joined to the side channels 8 by suitable gusset members and terminating under the ends of the buffer casting 29, the forward edge of which has an upwardly extending flange 32 and is curved on a radius the center of which is the pin for the draw bar adapted to be disposed in hole 23. The buffer casting 29 has suitable reenforcing webs extending back from flange 32 and a web through the bottom of which is secured the plate 25 and the marginal angle bars 27 previously described. These angle bars 27 support the top plate 25 between the buffer 29 and the body bolster 15. The channel bars 27, which support the plate 25, extend outwardly through the socket 22 and then flare outwardly to join the ends of the channel bars 31. The ends of the channel bars 31 and 27 are joined to each other and to the adjacent ends of the buffer casting 29.

This flared opening below the buffer member 29 provides play for the draw bar. The draw bar is adapted to be supported upon an arcuate guiding bar 35 which has its ends flanged down and secured to the flared channel bars 27. The floor boards 5 at the forward end rest upon an angle bar 36, shown in Fig. 5, arranged at each side on the inside of the web 31. Likewise a small channel is fastened on the inside of the channel bar 27 to give support for the floor boards at their inner ends.

Figure 3:
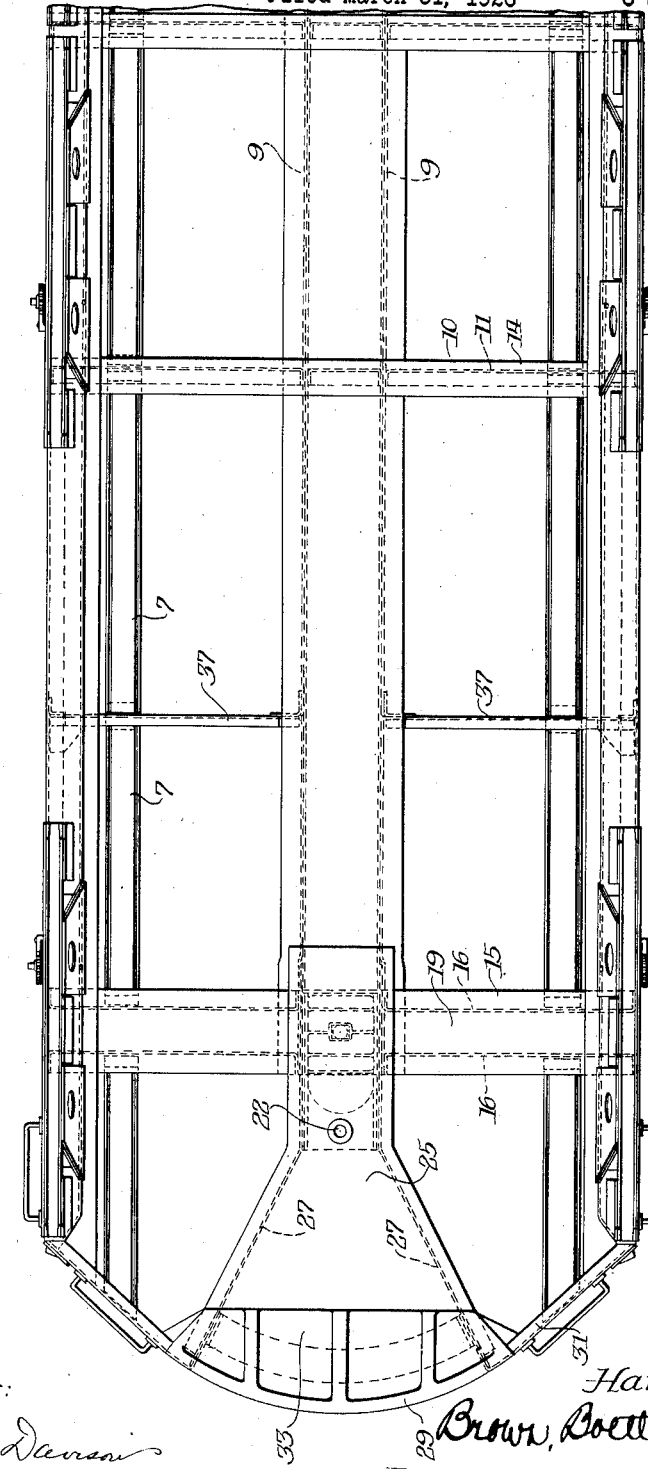
Fig. 3 is an enlarged plan view of one end of the car shown in Fig. 2.

Between the main body bolster 15 and the adjacent cross member 10 there is arranged at each end a needle beam 37. as is clearly shown in Fig. 3. This needle beam supports the adjacent ends of the channel bars 7 in which lie the wooden stringers 6 for supporting the floor boards. The floor boards are thus secured at each end to the wooden stringers 6 which extend longitudinally of the body of the car, and the ends of the floor boards 5 are further supported upon the pressed steel members 40, 40, see Figs. 6 and 7, which form a part of the side sills and which form a flange or guide along the edge of the platform of the car. These pressed steel members comprise a horizontal portion 41 which rests upon the top of the upper flange of the channel beam 8, a vertical portion which extends down into contact with the cross bearers, the needle beam and the body bolster, and a horizontal flange 43 which extends inwardly to rest upon said cross bearers, needle beam and body bolster, and upon which flange is mounted the adjacent end of the floor board 5. This pressed steel member 40 extends the full length of the side frame channel bars 8 on each side. The platform 4 with its guiding rail on each side is adapted to receive two semitrailers 44, as shown in Fig. 1, these semi-trailers comprising essentially a compartment 45 provided with doors at the rear which may be closed, locked, and sealed. The compartments 45 are adapted to receive goods in lots of less than car loads. The trailers each comprise further suitable running gear, including the wheels 46 mounted on a suitable axle 47, springs 48, and a suitable sub-frame to which the springs may be attached. At the forward end of each semi-trailer 44 there is provided on the chassis frame the upper half of a fifth wheel and a socket for receiving a stud, which stud is mounted upon a tractor that supports the front end of the semi-trailer and transports the semi-trailer by its power. The forward part of the semi-trailer 44 also has a pair of extensible legs 50 to provide an independent support for the forward end of the chassis frame. These legs are connected together to be foldable out of the way. They are provided with jack screws operable together to raise and lower the front end of the trailer.

The semi-trailer shown is a "Hiway trailer." The tractor I have used with the same is a White tractor. The tractor and the trailer do not, of themselves, constitute novel subject matter. The adjustable legs 50 are preferably operated by a crank (not shown), which crank is disconnectible and adapted to operate through suitable gears and jack screws to raise or lower the forward part of the trailer, as occasion may require. In operation, the forward part of the trailer is raised when the tractor is to be connected to the same, so that the short stud or king pin which projects from the center of the lower half of the fifth wheel on the tractor may drop into the socket in the upper half of the fifth wheel which is mounted on the chassis frame of the trailer. Thereafter, the jack is operated to lower the body so that the forward part of the same rests entirely upon the fifth wheel, and then the legs 50 are swung upwardly out of the way to clear the road. The rear wheels 46 under the trailer are not provided with brakes, but this is optional.

In order to secure the compartment 45 to the flat car, I provide elements operating in compression, namely, the struts 51 (see Figs. 5 and 6) which are mounted in stanchions 52 on pivots 53 running longitudinally of the car and supported in said stanchions.

I provide on the railroad car eight such stanchions 52, and while the struts 51 are adapted to support only the front end of the trailer, it is to be observed that the car is so arranged that the trailers may be loaded upon the same from either end and hence the stanchions are so arranged as to be available to support the front end of the trailer in either position.

The chassis frame or body 44 of the trailer is provided with a bail 54 which has its ends pivoted in brackets 55 and suitably secured to the lower frame of the compartment. It will be observed that the pivoted struts 51 are relatively wide for the purpose of giving sufficient strength and rigidity. They have at their upper ends hooks 56 which hook over the bails 54, as will be apparent from Fig. 6, with the result that when the weight of the body 45 is let down upon these struts, the struts push diagonally upward and inward and are retained in place by the bails 54. The struts 51 normally lie in slots formed in the stanchions 52, so that they are out of the way, suitable cross bars 57 preventing the struts from dropping through to the outside of the stanchions. When the struts 51 are put in place, wedges 58 are dropped between the stanchions and the struts so as to wedge themselves into position by gravity. The wedges 58 are attached to chains or cables 59 so that they may not be lost. The wedges 58 have guiding flanges 60 along one side to lie upon the outside of the struts 51 and thereby prevent displacement, and they have grooves 61 which bear against the adjacent edges of the slots in the stanchions 52, also to prevent displacement. The result is, after the wedges 58 are dropped into place, they are retained in position by the notches and flanges from endwise displacement and the action of gravity tends to draw them downwardly to hold the struts 51 in proper position.

Figure 4:
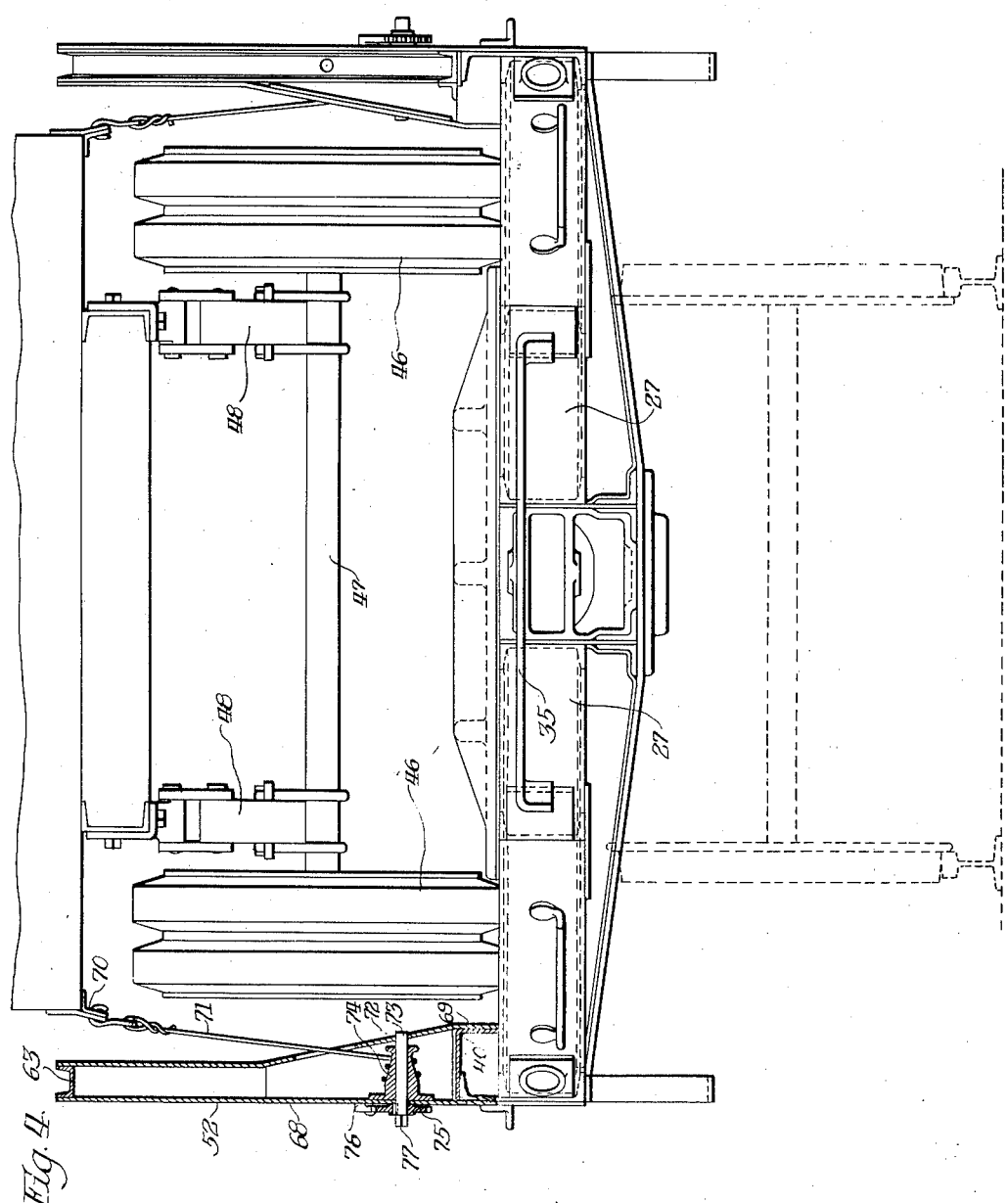
Fig. 4 is an end elevational view showing one of the stanchions in section to illustrate the cable winch.

The stanchions 52 are formed of two channel bars bent into U-shape, as will be apparent from Fig. 5. The outer channel bar 63, which opens outwardly as will be apparent from Figs. 4, 5, and 6, has its lower ends bent horizontally, as indicated at 64, then the channel extends diagonally upwardly, and then horizontally over the top of the slot in which the strut 51 lies.

The inner channel bar 65 is U-shape and it has its bottom part 66 extending horizontally and the two legs extend vertically along the sides of the slot, their upper ends being joined to the top of the inverted U of the channel bar 63. The parts 64 of channel bar 63 and 66 of channel bar 65 are both secured to the top flange of longitudinal channel or sill member 8 and to the top horizontal portion 41 of the longitudinal pressed steel member. Each stanchion 52 has an outer plate 68 which is joined to the outer flanges of the channels 65 and 63, and which extends down along the outside of the longitudinal channel sill 8. An inner plate 69 is likewise secured along the edges of the channels 63 and 65 at its upper portion and then it extends diagonally down and inside of the vertical portion 42 of the pressed steel members 40, as will be apparent from Fig. 6.

In order to hold the compartment down upon the struts 51, and also to eliminate as much as possible side sway, I provide a series of cables which are adapted to be hooked to brackets 70 having suitable eyes therein. These cables, shown at 71, are connected to winches 72, which as shown in the preferred form are mounted inside of the stanchions 52. While the winches are shown as mounted within the stanchions, it is to be understood that they may be mounted along the side frame members in any suitable position. Each winch comprises a shaft 73 pivoted in the side plate members 68 and 69. A drum member 74 is secured to the shaft 73 between the side plate members 68 and 69, and a ratchet wheel 75 is mounted on said shaft outside of the plates 68. A suitable pawl 76 co-operating with ratchet wheel 75 is pivoted on the side plate member 68. The shaft 73 has a squared end 77 adapted to be engaged by the same crank which operates the pedestal or jack member 50 for supporting the forward end of the trailer.

As shown, these cables 71 extend diagonally to the eyes 70 in order to brace the compartments both vertically and longitudinally. It will also be observed that these cables extend diagonally inwardly so that lateral sway is thereby limited.

Instead of extending the cables to the adjacent eyes 70, the cables 71 may be crossed, that is, by extending the front cable 71 to the rear eye, and the rear cable to the front eye so as to give a further diagonal fore-and-aft bracing.

It is believed that the operation of the device will be apparent from the foregoing detailed description, but I shall recapitulate the same briefly.

The platform 4 of the car is relatively low and is adapted to be placed endwise in register with a stationary slip or dock having a platform shaped to receive the end of the car platform and to register therewith. By means of a tractor connected to the trailer, the trailer is then backed upon the platform of the car. The pedestals or legs 50 are then dropped down into vertical position and the front end of the trailer is jacked up so that the tractor may be run out from underneath the trailer. Next, the struts 51 are hooked into the bails 54, the body being lowered to permit this to be accomplished, and then the jacks 50 are operated further to let the entire or substantially the entire weight down upon the struts. The wedges 58 are dropped in the angle between the stanchions 52 and the struts 51 to wedge the struts firmly in place. Then the cables 71, which have hooks at their outer ends, are hooked into the eyes 70 either as shown in Figs. 1 and 5, or in crossed relation and through the medium of the winches are drawn tight to brace the body both fore-and-aft and sidewise. A second trailer is then backed in the car and similarly mounted and anchored. The railroad car may then be transported to another station, and by reversing the above described operations the trailer may be released and made ready for reception by a tractor for removal and distribution. This phase of the operation is disclosed and claimed in the co-pending application of Britton I. Budd, above referred to.

It is to be observed that the pressed steel guides 40 extend inward further than the upper parts of the stanchions, so that the guides will guide the wheels of the tractor and trailer and prevent the compartment from striking the stanchions.

While I have shown an embodiment in which the railroad car is adapted to receive two trailers, the invention is not to be limited to the loading of two trailers upon a car. The number of trailers loaded upon the railroad car is not of the essence of the invention. Also, while I show both trailers loaded onto the car from one end, I do not intend to be limited to this manner of loading.

I do not intend to be limited to the details shown and described.

I claim:—

1. In combination, a railroad car having track wheels and a deck, a vehicle including a wheel mounted chassis and a body mounted thereon forming a compartment for reception of goods to be shipped, said vehicle being supported upon the deck of the car, cable winding and securing means carried by the car, cables operatively connected to said means and eye members secured to the body remote from the ends thereof, the cables having members insertible through the eye members for detachably securing said eye members and the cables together, the cable winding and securing means being disposed outwardly toward the ends of the vehicle beyond the respective eye members whereby the cables are disposed at an inclination downwardly and outwardly of the vehicle body toward the ends thereof when drawn taut, the cables being thus disposed to resist endwise movement of the vehicle as well as tilting and transverse movement thereof.

2. In combination, a first vehicle having supporting wheels, a second vehicle having a compartment for goods to be shipped in less than carload lots, said second vehicle being loaded upon the first vehicle, pivoted struts mounted on the first vehicle for engagement with the compartment, and winches on said first vehicle, said winches having cables adapted for connection with the second vehicle.

3. In combination, a railroad car having a platform, longitudinal guides along the edge of the platform, stanchions mounted on said guides, and strut members pivoted on said stanchions and adapted to extend inwardly.

4. In a railroad car, a main frame comprising longitudinal side sills formed of channels having their flanges extending inwardly, and plates resting upon said flanges and forming guides for vehicle wheels, said guides projecting above the platform of the car.

5. In combination, a railroad car having a platform, longitudinal side frame members, and steel plates for said side members having horizontal portions lying over the side frame members, and vertical portions providing guides for vehicle wheels along the edges of the platform.

6. In combination, a railroad car having a platform, guiding flanges along the edges of the platform, adjustable struts mounted on said guiding flanges, said struts being pivoted to have their upper ends swung inwardly, and winches also mounted on said flanges, said winches having cables.

7. In combination, a railroad car having side frame members, stanchions mounted on said side frame members and projecting upwardly, struts pivoted on said stanchions, and wedge members adapted to be disposed between the stanchions and the struts for preventing outward movement of the struts.

8. In combinaion, a railroad car having a platform, and having struts disposed adjacent the margins of the platform, a vehicle on the platform of the car resting a part of its weight upon said struts, cables attached to said vehicle, and winches for said cables mounted at the margins of the platform of the car.

9. In combination, a railroad car having vertically extending posts along the margins, pivoted struts adapted to swing inwardly, a vehicle mounted on the platform of the car and having its body resting upon said struts, and wedges disposed between the struts and the posts.

10. In combination, a railroad car having a platform, posts extending upward from the margins of the platform, struts pivoted on said posts, said struts being adapted to swing inwardly, and means on the upper ends of the struts for hooking them to a body to be supported.

11. In combination, a railroad car having a platform, posts extending upward from the edges of the platform, struts pivoted at their lower ends on said posts, a vehicle on said platform, said vehicle having a body, said body and said struts having co-operating parts for hooking the same together, and means to prevent disengagement of said hooking means.

12. In combination, a railroad car having a platform, posts projecting up from the edges of the platform, struts pivoted at their lower ends on said posts, a vehicle body adapted to be supported on said struts, said vehicle body having bails at the lower edges of the same, said struts having hooks for engaging said bails, and wedge members between the struts and the posts.

13. A railroad car having frame members comprising longitudinal side sill channels, and longitudinal plates resting on top of the channels and extending inwardly and downwardly to provide guide rails, and a platform below said guide rails.

14. In a railroad car, a side sill member, a vertical stanchion projecting from said side sill member, said stanchion comprising an inverted U-shaped frame secured to the side sill member, an upright U-shaped frame within said inverted U-shaped frame, plates covering said frame, and a pivoted strut within the upright U-shaped frame.

15. In a railroad car, a side frame sill member, a stanchion projecting upwardly from said sill member, said stanchion being slotted, a strut pivoted within said slot, said stanchion having a frame member extending over the slot.

16. In combination, a platform car provided with track wheels, a removable compartment on said car, a chassis comprising road wheels under one end of the compartment and a pair of jacks under the other end, tension means mounted on the car to tie the compartment down, and diagonal struts to prevent side sway of the compartment.

In witness whereof, I hereunto subscribe my name this 26th day of March, 1926.

HAROLD A. OTIS.